Figure 1:
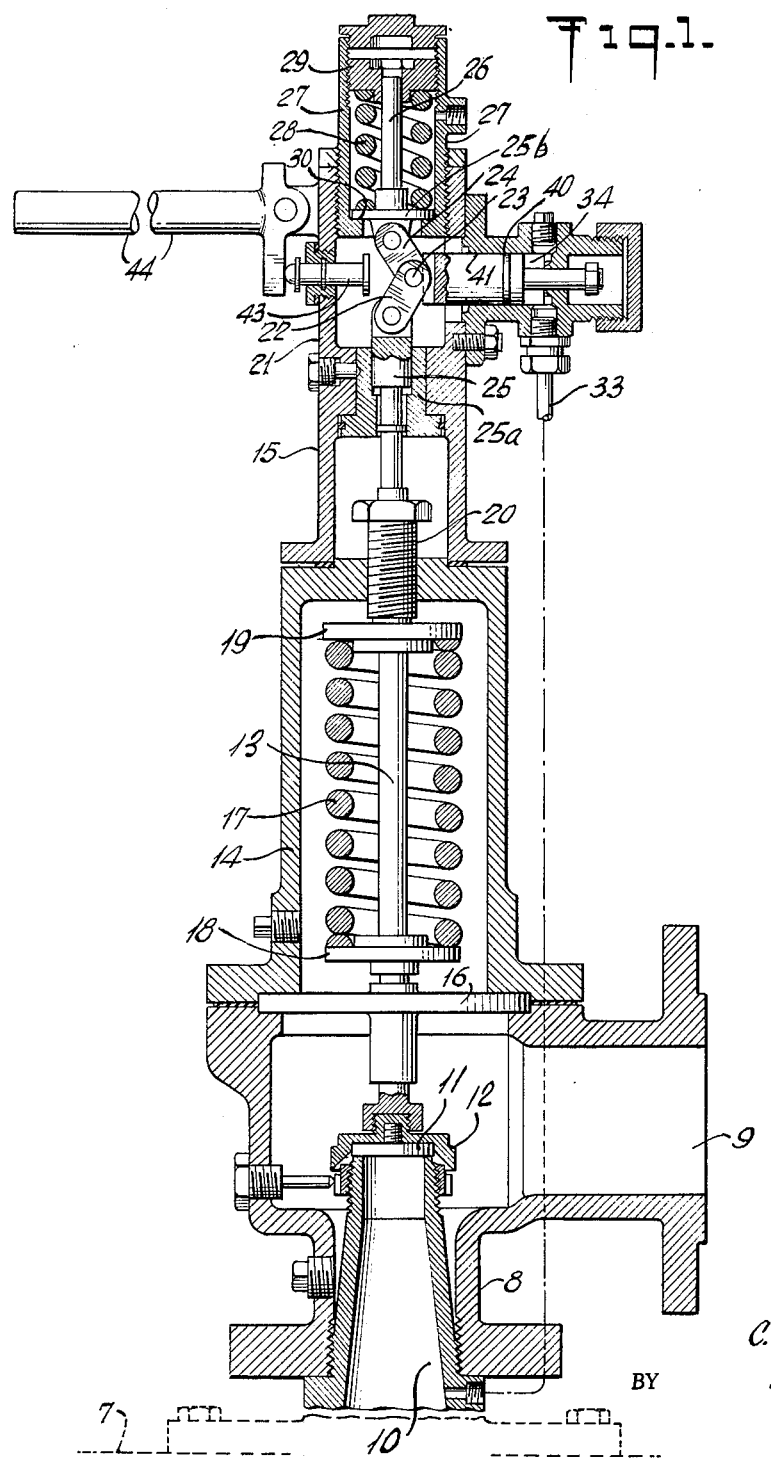

Jan. 18, 1966     C. W. WIEGAND     3,229,713

PRESSURE CONTROL VALVE

Filed Nov. 6, 1962     2 Sheets-Sheet 1

INVENTOR.
C. W. Wiegand

BY Willis B Rice

ATTORNEY

2

United States Patent Office 3,229,713
Patented Jan. 18, 1966

3,229,713
PRESSURE CONTROL VALVE
Charles W. Wiegand, 18 Circuit Road,
New Rochelle, N.Y.
Filed Nov. 6, 1962, Ser. No. 235,691
12 Claims. (Cl. 137—467)

This invention relates to pressure relief devices used on pressure vessels in which fluids are contained under pressure.

The purpose of this invention is to reduce undue loss of contained fluids when said device is of the conventional spring loaded valve type or to reduce the vessel design strength when said device is a rupture disc assembly.

In such a conventional spring loaded valve, a spring force is exerted on a valve disc which in turn presses against an opening in the valve body which is connected to said vessel. The greater the force exerted on the disc the tighter the closure. As the pressure of the contained fluid in the vessel increases, the gross spring force on the valve disc is reduced by the counter pressure of the fluid on the opposite area of the disc, resulting in a net closing force which is the difference between the gross spring force (set pressure) and the operating pressure in the vessel.

Where the gross spring force is 100% (set pressure) and the usual operating pressure is 90% of the set pressure, the net closing spring force on the disc is only 10%. This 10% spring force is usually not sufficient to insure a tight valve, resulting in leakage of valuable products or hazardous fluids to the atmosphere or flare. Operating pressure surges may further reduce this 10% margin and could also cause the valve to go into a simmer stage (which is just below the set pressure or opening point of the valve) causing a greater degree of leakage.

My invention in this instance is a device which will transmit a plus force on the valve disc as the internal pressure in the vessel increases and at a predetermined pressure release said plus force permitting the valve to function in a normal manner. This amount (or percentage of the set pressure) of superimposed force on the valve disc can be controlled by adjusting a limit stop on my device so that all or part of the force developed may be applied to the valve disc.

As to a rupture disc for relieving excess pressure in a vessel, it is common practice to design the vessel and the rupture pressure of the disc 50% above the operating pressure. Due to the fact that the rupture disc is unsupported and will burst at a close given pressure value, the operating pressure must be substantially below this rupture point. This requires a vessel approximately 35% greater in strength than a vessel being protected by a valve described above.

My invention in this instance is a device similar to that described above which will apply a force on the discharge side of the rupture disc to reinforce the unsupported portion thereof and thereby increase the bursting pressure value for any given disc.

For a vessel designed for 100% pressure and operating at 90%, the rupture disc will be designed to burst at 100%. By the adaptation of my device, the bursting pressure value of this same disc can be increased to 150% bursting value.

At a predetermined pressure value (100%) in the vessel, said plus force exerted on the disc by my device is released, causing the disc to rupture thereby releasing the pressure in the vessel.

To accomplish my results I employ a pressure sensing element so connected that as the pressure in the vessel increases the said element transmits an increasing force on the knee portion of a bent toggle. One end of one toggle arm is in contact with a disc element of the primary spring of a valve, and the other toggle arm is in contact with a compression control spring. As the pressure in the vessel increases so will the pressure force on the knee of the toggle increase, causing the angle of the toggle to lessen which increases an over-all toggle length. This also compresses the attached control spring, creating a force which is applied through the toggle to the primary pressure relieving devices described above as superimposed force.

At a predetermined pressure value the spring force can no longer restrain the movement of the toggle causing it to go past dead center resulting in the immediate release of the superimposed force of my device on the primary pressure-relieving device.

Fail safe features have been incorporated in my device so that in the event the pressure in the vessel fails to enter the pressure force transmitting element, the design permits the toggle to fold to an ineffective limp position allowing the primary device to function in the normal manner.

Figure 2:
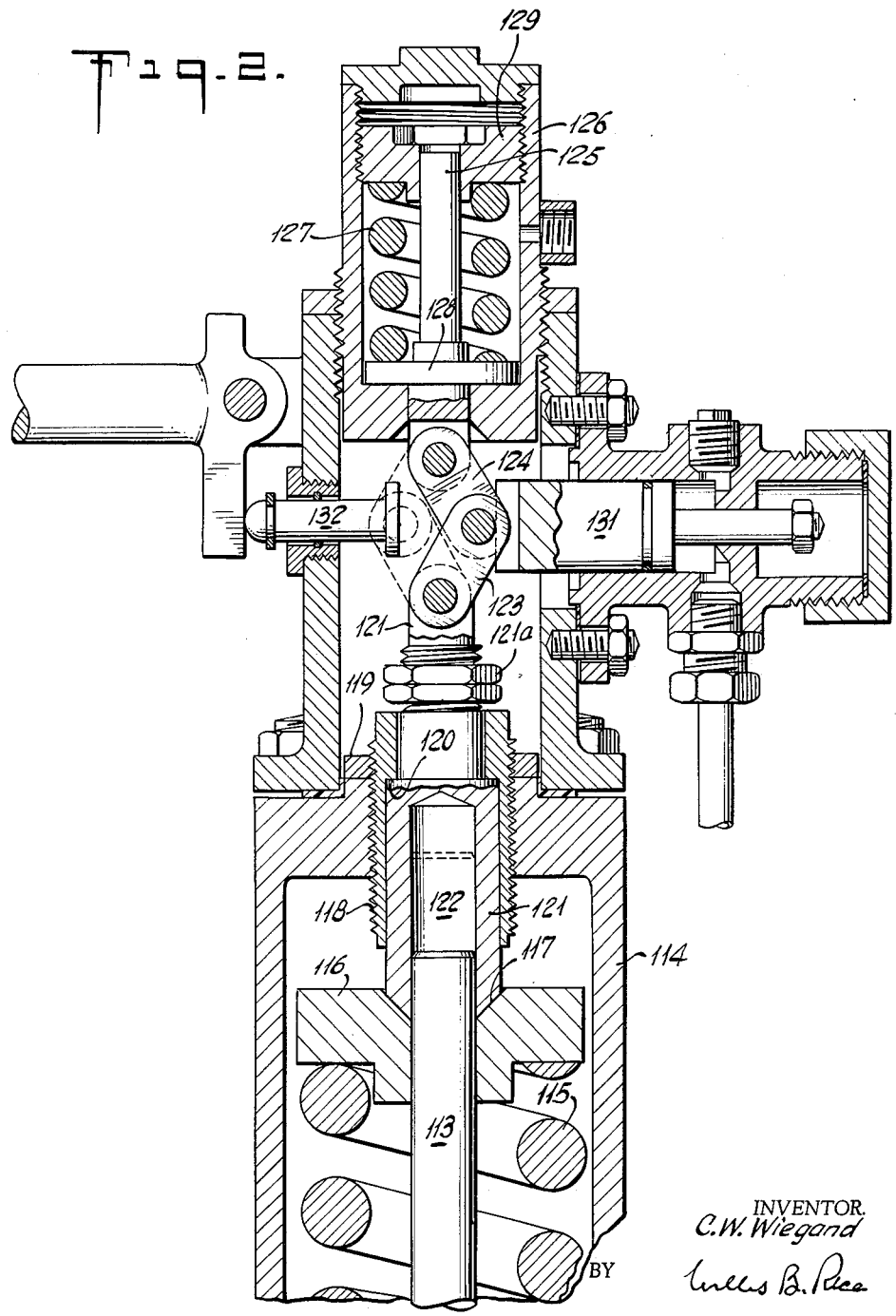

Another fail safe feature is a part of FIG. 2 whereas the valve stem can lift regardless of the working conditions of my device.

The limit stop shown in FIG. 2 controls how much superimposed force can be applied to the valve over and above its normal set pressure. Should my device jam mechanically, the opening pressure point (set pressure) can be predicated beforehand by the adjustment of the toggle limit stop.

My invention is purely a static operated device eliminating small orifices subject to clogging and the venting to atmosphere as is common practice in the so-called pilot operated relief valve.

In the accompanying drawings FIG. 1 is a vertical central section of one form of the device, and FIG. 2 is a section through the control mechanism of a modified form.

Referring now to FIG. 1 the numeral 7 is a wall of a pressure vessel having an outlet nipple 10 extending up from it. Surrounding this nipple 10 is the base 8 of a relief valve having a discharge outlet 9.

The outlet nipple 10 is closable by a disc 11 carried in a socket member 12 which in turn is connected to a valve stem 13. The outlet nipple 10 of the vessel 7 discharges into a discharge outlet 9 to waste or to recovery.

The valve stem 13 passes upwardly through the control mechanism above it. The spring chamber 14 for the valve operating spring 17 is separated from the valve chamber by a disc 16 which also provides a bearing for the valve stem 13.

The valve operating or main spring 17 surrounding the stem 13 is carried in chamber 14 and bears downwardly on a disc 18 fixed on the valve stem, and the top of the spring presses against the underside of a disc 19 concentric with the valve stem 13 and slidable on it. This disc 19 is engaged on its upper surface by a threaded sleeve 20 in a chamber 15, which sleeve is screwed into the top of the spring chamber 14 so that the downward pressure of spring 17 on the disc 18 and hence on the disc 11 is adjusted by screwing the sleeve 20 to adjust the compression spring 17.

The control mechanism is carried in a casing 21 above the chamber 15. This mechanism comprises a toggle having a lower arm 22 and an upper arm 24 pivoted together at 23.

The lower arm 22 is connected to a rod 25 sliding vertically in a bearing 25a and positioned so that it may engage and bear against the valve stem 13.

The upper arm 24 of the toggle is pivoted to a head 25 on a vertical rod 26 which is slidable in a chamber 27 concentric with and above the chamber 21. Within this chamber 27 is a spring 28 which is held in compression by a bushing 29 screwed into the top of the chamber 27 and this spring 28 bears against the head 25b to urge it against an inturned flange 30 on the bottom of the chamber 27. The bushing 29 is adjustable to permit the adjustment of the compression on the spring 28, and hence to adjust the force required to restrain the rod 26 as the toggle is being straightened. Chamber 27 is screw-threaded into the chamber 21 to control the angle of the toggle arms 22 and 24.

In horizontal alignment with the knee 23 of the toggle is a horizontal piston 40 sliding in a cylinder 41. This cylinder is closed at its other end except for a conduit 33 which leads up from the pressure tank or vessel 7. This piston 40 is of such a diameter and length that when the pressure within the tank rises to a point somewhat below the predetermined maximum pressure the piston 40 will engage the knee of the toggle, tending to straighten it. As the pressure increases it will lift head 25b from its seat, compressing spring 28 and transferring the force of the spring 28 to the toggle link and hence through the toggle, applying that force as plus loading on the disc 11. In actual operation it will be noted that this plus loading as applied to the disc 11 occurs at the pressure point where without the plus loading the valve could tend to simmer. The parts are so proportioned, however, that when the pressure rises to the predetermined maximum it is sufficient to break the toggle, relieving all the plus loading, and permitting the valve to open in response to the internal pressure in the vessel on the valve.

A plunger 43 is mounted in the casing 21 opposite the knee of the toggle, of a dimension and so placed that when the plunger 43 is actuated the knee of the toggle is pushed back past dead center to its original position, ready to condition the disc 11 for reuse. This plunger 43 may be operated by any suitable lever 44 mounted on the frame.

In the embodiment of FIG. 2 the valve stem 113 extends up through the spring chamber 114 and the spring 115 and slides loosely in the bore of a spring washer 116. This washer 116 has a central conical recess 117 at its upper face surrounding the valve stem 113.

Screwed into the top of the spring chamber 114 is a threaded sleeve 118 above which is screwed a threaded lock nut 119. This sleeve 118 has upon its inside a downwardly facing shoulder 120. A hollow rod 121 is slidably mounted within the sleeve 118 and has an upwardly facing shoulder to engage shoulder 120. A hollow rod 121 is slidably mounted within the sleeve 118 and has an upwardly facing shoulder to engage shoulder 120. This rod 121 has in its lower portion a cylindrical axial recess 122 in alignment with and of a size to guide the valve stem 113. The movement of rod 121 is limited by lock nut 121a.

The upper end of the rod 121 extends upwardly and is pivoted to the lower arm 123 of a toggle. The upper arm 124 of the toggle is pivoted to the rod 125 extending up through a chamber 126 carrying a spring 127. This spring bears downwardly upon a flange 128 and is held in compression by a threaded bushing 129 screwed into the top of chamber 126. A piston 131, as in the previous embodiment, is operable by the pressure from the vessel 7 as shown in FIG. 1, and a hand operated rod 132 can restore the toggle to its original position when desired.

With this construction the original spring loading of the valve from spring 115 may be adjusted by sleeve 119 to determine the height of the washer 116, and hence the initial compression of the spring 115. This initial setting, that is, the initial loading, is therefore independent of the toggle mechanism, providing a fail safe feature.

As the pressure in the vessel approaches the value for which the spring 115 is set, the toggle arms commence to straighten out, compressing and thus putting a plus force from spring 127 on the sliding rod 121, this force added to the original pressure setting will add a plus loading on the valve disc. This will only be relieved at a preselected pressure by the breaking of the toggle as in the embodiment shown by FIG. 1.

Nut 121a is adjustable on rod 121 to limit the downward movement of rod 121 so as to limit the part of the force of spring 127 which is added to spring force 115. A nut is used to lock nut 121a in position. Chamber 126 is adjustable for height so as to properly set the initial toggle angle which could vary due to arm 121 subject to different heights caused by spring adjusting sleeve 118.

This mechanism is equally applicable to a ruptured disc form of pressure release in which case a disc somewhat smaller than the rupture disc bears down upon the central portion of the ruptured disc, counteracting the strain imposed by the fluid in the vessel. At a maximum pressure value the excess force thus imposed on the disc is released by the breaking of the toggle, the rupture disc is free to release at the pressure for which it is designed.

It will be noted that in both forms of the invention, the toggle is not fixed to the piston which bears against the knee of the toggle and therefore can move in relation to said piston, as a fail safe operation, in the event that the piston fails to move in the cylinder.

While I have shown and described two embodiments of my invention, it will be understood that the invention may be embodied otherwise than as here shown and that various changes in details of construction and in the arrangement of parts may be made without departing from the underlying idea of the invention within the scope of the appended claims.

What I claim:

1. A pressure control mechanism for a pressure vessel, comprising a safety valve controlled flow from said vessel and adapted to be released at a predetermined pressure in said vessel, a main spring loading said valve in opposition to the pressure in said vessel, an auxiliary spring, means including a normally collapsed toggle mechanism having one arm operatively connected to said main spring and its other arm operatively connected to said auxiliary spring for compressing said auxiliary spring and thereby adding the force of said auxiliary spring to the loading of the valve by said main spring when moved from said collapsed position toward a toggle straightening position, and cooperative piston means operatively connected to said toggle and responsive to pressure in said vessel slightly below said predetermined pressure to effect straightening of said collapsed toggle and responsive to said predetermined pressure to effect further movement of and collapsing of said toggle and thereby relieving the added force imposed on said safety valve and restoring the control to said safety valve main spring.

2. A pressure control mechanism for a pressure vessel, comprising a safety valve controlling flow from said vessel and adapted to be released at a predetermined pressure in said vessel, a main spring loading said valve in opposition to the pressure in said vessel, an auxiliary spring, means including a normally collapsed toggle mechanism having one arm operatively connected to a said main spring and its other arm operatively connected to said auxiliary spring for compressing said auxiliary spring and thereby adding the force of said auxiliary spring to the loading of the valve by said main spring when moved from said collapsed position toward a toggle straightening position, and cooperative piston means operatively connected to said toggle and responsive to pressure in said vessel slightly below said predetermined pressure to effect straightening of said collapsed toggle and responsive to said predetermined pressure to effect further movement of and collapsing of said toggle and thereby relieving the added force imposed on said safety valve and restoring the control to said safety valve main spring, said toggle having its knee positioned for releasable engagement by said cooperative piston means.

3. A pressure control mechanism for a pressure vessel, comprising a safety valve controlling flow from said vessel and adapted to be released at a predetermined pressure in said vessel, a main spring loading said valve in opposition to the pressure in said vehicle, an auxiliary spring, means including a normally collapsed toggle mechanism having one arm operatively connected to said main spring and its other arm operatively connected to said auxiliary spring for compressing said auxiliary spring and thereby adding the force of said auxiliary spring to the loading of the valve by said main spring when moved from said collapsed position toward a toggle straightening position, and cooperative piston means operatively connected to said toggle and responsive to pressure in said vessel slightly below said predetermined pressure to effect straightening of said collapsed toggle and responsive to said predetermined pressure to effect further movement of and collapsing of said toggle and thereby relieving the added force imposed on said safety valve and restoring the control to said safety valve main spring, said main and auxiliary springs being in longitudinal alignment with a space between the adjacent ends of said springs, said valve having a stem extending from said valve into part of said space and said toggle having said one arm thereof operatively connected to said stem in said space and said main spring having a connection with said stem for said loading of said valve.

4. A pressure control mechanism for a pressure vevel, comprising a safety valve controlling flow from said vessel and adapted to be released at a predetermined pressure in said vessel, a main spring loading said valve in opposition to the pressure in said vessel, an auxiliary spring, means including a normally collapsed toggle mechanism having one arm operatively connected to said main spring and its other arm operatively connected to said auxiliary spring for compressing said auxiliary spring and thereby adding the force of said auxiliary spring to the loading of the valve by said main spring when moved from said collapsed position toward a toggle straightening position, and cooperative piston means operatively connected to said toggle and responsive to pressure in said vessel slightly below said predetermined pressure to effect straightening of said collapsed toggle and responsive to said predetermined pressure to effect further movement of and collapsing of said toggle and thereby relieving the added force imposed on said safety valve and restoring the control to said safety valve main spring, said toggle having its knee positioned for releasable engagement by said cooperative piston means, said main and auxiliary springs being in longitudinal alignment with a space between the adjacent ends of said springs, said valve having a stem extending from said valve into part of said space and said toggle having one arm thereof operatively connected to said stem in said space and said main spring having a connection with said stem for said loading of said valve.

5. A pressure control mechanism for a pressure vessel, comprising a safety valve controlling flow from said vessel and adapted to be released at a predetermined presruse in said vessel, a main spring loading said valve in opposition to said pressure in the vessel, said valve having an operating stem, means including a normally collapsed toggle mechanism, means providing an operative connection of one of the arms of said toggle mechanism to said valve stem, an auxiliary spring operatively connected to the other arm of said toggle mechanism and acting through said toggle mechanism and said valve stem to add to the loading of said valve by said main spring when moved from said collapsed position toward a toggle straightening position, and cooperative piston means operatively connected to said toggle and responsive to pressure in said vessel slightly below said predetermined pressure to effect straightening of said collapsed toggle and responsive to said predetermined pressure to effect further movement of and collapsing of said toggle and thereby relieving the added force imposed on said safety valve and restoring the control to said safety valve main spring.

6. A presssure control mechanism for a pressure vessel, comprising a safety valve controlling flow from said vessel and adapted to be released at a predetermined pressure in said vessel, a main spring loading said valve in opposition to said pressure in the vessel, said valve having an operating stem, means including a normally collapsed toggle mechanism, lost motion means providing an operative connection of one of the arms of said toggle mechanism to said valve stem, an auxiliary spring operatively connected to the other arm of said toggle mechanism and acting through said toggle mechanism and said valve stem to add to the loading of said valve by said main spring when moved from said collapsed position toward a toggle straightening position, and cooperative piston means operatively connected to said toggle and responsive to pressure in said vessel slightly below said predetermined pressure to effect straightening of said collapsed toggle and responsive to said predetermined pressure to effect further movement of and collapsing of said toggle and thereby relieving the added force imposed on said safety valve and restoring the control to said safety valve main spring.

7. A pressure control mechanism for a pressure vessel, comprising a safety valve controlling flow from said vessel and adapted to be released at a predetermined pressure in said vessel, a main spring loading said valve in opposition to said pressure in the vessel, said valve having an operating stem, means including a normally collapsed toggle mechanism, means providing an operative connection of one of the arms of said toggle mechanism to said valve stem, said connection comprising a rectilinearly movable member pivotally connected at one end thereof to the outer end of said one arm of the toggle mechanism, said member having its other end in releasable engagement with said valve stem, an auxiliary spring operatively connected to the other arm of said toggle mechanism and acting through said toggle mechanism and said valve stem to add to the loading of said valve by said main spring when moved from said collapsed position toward a toggle straightening position, and cooperative piston means operatively connected to said toggle and responsive to pressure in said vessel slightly below said predetermined pressure to effect straightening of said collapsed toggle and responsive to said predetermined pressure to effect further movement of and collapsing of said toggle and thereby relieving the added force imposed on said safety valve and restoring the control to said safety valve main spring.

8. Control means for a fluid pressure relief device for a vessel containing fluid under pressure therein, said relief device comprising means for providing a passage for the flow of fluid from said vessel, a member controlling flow from said vessel and normally operable to prevent the flow of fluid from said vessel through said passage and responsive to a predetermined pressure within said vessel to provide said passage for the flow of fluid from said vessel, a first compression spring, a second compression spring in axial alignment with said first spring, a normally collapsed toggle lever having one arm thereof operatively connected to said first spring and the other arm thereof operatively connected to said second spring, said first spring being operatively connected to said pressure responsive member for exerting pressure thereon in opposition to the pressure thereon of fluid pressure in said vessel when moved from said collapsed position toward a toggle straightening position, and cooperative piston means operatively connected to said toggle and responsive to pressure in said vessel slightly below said predetermined pressure to effect straightening of said collapsed toggle and responsive to the said predetermined pressure to effect further movement of and collapsing of said toggle when the fluid in said vessel is at said predetermined pressure.

9. Control means for a fluid pressure relief device for a vessel containing fluid under pressure therein, said relief device comprising means for providing a passage for the flow of fluid from said vessel, a valve controlling flow from said vessel and normally operable to prevent the flow of fluid from said vessel through said passage and responsive to a predetermined pressure within said vesesl to proside said passage for the flow of fluid from said vessel, a first compression spring, a second compression spring in axial alignment fith said first spring, a normally collapsible toggle comprising a toggle lever having one arm thereof operatively connected to said first spring and the other arm thereof operatively connected to said second spring, said first spring being operatively connected to said pressure responsive valve for exerting pressure thereon in opposition to the pressure thereon of fluid pressure in said vessel when moved from said collapsed position toward a toggle straightening position, and cooperative piston means responsive to pressure in said vessel slightly below said predetermined pressure to effect straightening of said collapsed toggle and responsive to said predetermined pressure to effect further movement of and collapsing of said toggle when the fluid in said vessel is at said predetermined pressure.

10. Control means for a fluid pressure relief device for a vessel containing fluid under pressure therein, said relief device comprising means for providing a passage for the flow of fluid from said vessel, said means including a pressure retaining member controlling flow from said vessel and normally acting to prevent the flow of fluid from said vessel through said passage and operable in response to a predetermined pressure within said vessel to provide said passage for the flow of fluid from said vessel, a compression spring, a normally collapsed partially bent toggle lever having one arm thereof operatively connected to said pressure retaining member and the other arm operatively connected to the said spring, and cooperative piston means responsive to pressure in said vessel slightly below said predetermined pressure to effect straightening of said collapsed toggle and responsive to said predetermined pressure to effect further movement of and collapsing of said toggle thereby relieving the added force imposed on said pressure retaining member by said spring and restoring the control to said pressure retaining member.

11. A pressure control mechanism for retaining and limiting the fluid pressure in a vessel, comprising a pressure relief valve controlling flow from said vessel adapted to open at a predetermined pressure, a main compression spring for loading said valve in opposition to the pressure in said vessel, said valve having a valve stem, an auxiliary compression spring in axial alignment with said valve stem, a normally collapsed toggle positioned between said auxiliary spring and said valve stem with the outer ends of the toggle arms operatively connected to said auxiliary spring and said stem to increase the spring loading of said valve when moved from said collapsed position toward a toggle straightening position, respectively, and cooperative piston means responsive to pressure in said vessel slightly below said predetermined pressure to effect straightening of said collapsed toggle and responsive to said predetermined pressure to effect further movement of and collapsing of said toggle thereby releasing said increased spring loading on said valve stem and concomitantly restoring the control of the valve to said main valve spring.

12. A pressure control mechanism for retaining and limiting the fluid pressure in a vessel comprising a safety valve controlling flow from said vessel and adapted to open at a predetermined pressure, a main spring for loading said valve in opposition to the pressure in said vessel, an auxiliary compression spring in axial alignment with said main spring, a normally collapsed toggle having one arm thereof operatively connected to said main spring and the other arm thereof operatively connected to said auxiliary spring to increase the spring loading of said valve when said toggle is moved from said collapsed position toward a toggle straightening position, and cooperative piston means responsive to pressure in said vessel slightly below said predetermined pressure to effect straightening of said collapsed toggle and responsive to said predetermined pressure to effect further movement of and collapsing of said toggle, thereby releasing the force of the auxiliary spring imposed on said main spring and restoring the control of the valve to said main spring.

References Cited by the Examiner

UNITED STATES PATENTS

| 363,643 | 5/1887 | Jacobs | 251—58 |
| 2,973,776 | 3/1961 | Allen | 137—467 |
| 3,041,969 | 7/1962 | Filstrup | 251—75 X |
| 3,095,901 | 7/1963 | Larson et al. | 251—280 XR |

FOREIGN PATENTS 160,533  1/1955  Australia.

MARTIN P. SCHWADRON, *Acting Primary Examiner.*

ISADOR WEIL, *Examiner.*